United States Patent [19]

Zhou et al.

[11] Patent Number: 5,146,204

[45] Date of Patent: Sep. 8, 1992

[54] THEFT DETECTION APPARATUS AND FLATTENED WIRE TARGET AND METHOD OF MAKING SAME

[75] Inventors: Peter Y. Zhou, Ronkonkoma; Thomas P. Solaski, Hicksville, both of N.Y.

[73] Assignee: Knogo Corporation, Hauppauge, N.Y.

[21] Appl. No.: 630,855

[22] Filed: Dec. 20, 1990

Related U.S. Application Data

[63] Continuation-in-part of Ser. No. 492,785, Mar. 13, 1990, abandoned.

[51] Int. Cl.⁵ .............................................. G08B 13/24
[52] U.S. Cl. ..................................... 340/551; 340/572
[58] Field of Search .............. 340/551, 572; 148/108, 148/129, 310, 312; 156/272.2

[56] References Cited

U.S. PATENT DOCUMENTS

| | | | |
|---|---|---|---|
| 3,534,243 | 1/1968 | Kondo et al. | 363/49 |
| 3,673,437 | 6/1972 | Wright | 340/572 X |
| 3,737,735 | 6/1973 | Benassi | 361/198 |
| 3,790,945 | 2/1974 | Fearon | 340/572 |
| 3,820,103 | 6/1974 | Fearon | 340/572 |
| 3,820,104 | 6/1974 | Fearon | 340/572 |
| 3,932,872 | 1/1976 | Zenel et al. | 343/788 |
| 3,980,913 | 9/1976 | Peterson | 310/155 |
| 4,030,892 | 6/1977 | Mendelsohn et al. | 428/226 |
| 4,074,249 | 2/1978 | Minasy | 340/572 |
| 4,118,693 | 10/1978 | Novikoff | 340/572 |
| 4,326,198 | 4/1982 | Novikoff | 340/572 |
| 4,536,229 | 8/1985 | Jin et al. | 148/310 |
| 4,568,921 | 2/1986 | Pokalsky | 340/572 |
| 4,623,877 | 11/1986 | Buckens | 340/572 |
| 4,651,116 | 3/1987 | Schloemann | 333/235 |
| 4,778,552 | 10/1988 | Benge et al. | 340/572 X |
| 4,945,339 | 7/1990 | Yamauchi et al. | 340/551 |
| 5,029,291 | 7/1991 | Zhou et al. | 340/551 |

FOREIGN PATENT DOCUMENTS

| | | |
|---|---|---|
| 0078401 | 5/1983 | European Pat. Off. |
| 0170854 | 2/1986 | European Pat. Off. |
| 0354759 | 2/1990 | European Pat. Off. |
| 763681 | 5/1934 | France |

OTHER PUBLICATIONS

"Magnetism and Metallurgy of Soft Magnetic Materials", Chih-Wen Chen, Dover Publications Inc., pp. 388-389.

"Magnetic Materials", Tebble, et al., Wiley-Interscience, pp. 466-467.

"Metallurgical Control of Magnetic Properties in Co-Fe and Ni-Fe Alloys for Memory Applications", G. Y. Chin, et al., J. Appl. Phys., vol. 42, No. 4, pp. 1502-1509, Mar. 1971.

"Introduction to Magnetic Materials", B. D. Cullity, Addison-Wesley Publishing Co., pp. 517-523, 1972.

"Slip-Induced Directional Order in Fe-Ni Alloys. I. Extension of the Chikazumi-Suzuki-Iwata Theory", G. Y. Chin, J. Appl. Phys., vol. 36, No. 9, pp. 2915-2924, Sep. 1965.

"Slip-Induced Directional Order in Fe-Ni Alloys. II Experimental Observations", G. Y. Chin, et al., J. Appl. Phys., vol. 38, No. 6, pp. 2623-2629, May 1967.

Primary Examiner—Jin F. Ng
Assistant Examiner—Thomas J. Mullen, Jr.
Attorney, Agent, or Firm—Fitzpatrick, Cella, Harper & Scinto

[57] ABSTRACT

Items of merchandise (30) are protected from shoplifting or theft by affixing to them special responder targets (32), which are formed by drawing a material of high magnetic permeability into a thin wire and thereafter rolling the wire into a flattened strip and annealing the strip and severing the strip into individual lengths. The flattened strip may be positioned on an adhesively coated base strip (42) and covered by a peel strip (46). Slug-like deactivation elements (48) of hard magnetic material may be positioned along the strip for deactivating it.

57 Claims, 2 Drawing Sheets

Fig.1.

THEFT DETECTION APPARATUS AND FLATTENED WIRE TARGET AND METHOD OF MAKING SAME

CROSS-REFERENCE TO RELATED APPLICATIONS

This is a continuation-in-part of copending application Ser. No. 07/492,785 filed Mar. 13, 1990 in the names of Y. Peter Zhou and Thomas P. Solaski, now abandoned.

BACKGROUND OF THE INVENTION

1. Field of the Invention

This invention relates to theft detection apparatus of the type in which a protected object is detected by monitoring the magnetic fields produced by responder targets on protected articles when such articles are carried through an interrogation zone in which an alternating magnetic field is generated. In particular the invention comprises improvements relating to the responder targets and their manufacture.

2. Description of the Prior Art

French Pat. No. 763,681 to Pierre Arthur Picard discloses an article apparatus of the type to which this invention applies. As described in that patent, articles to be protected from theft are provided with responder targets in the form of thin strips of material having a high magnetic permeability and which are rapidly and repeatedly driven into and out of magnetic saturation in the presence of an alternating magnetic interrogation field. An interrogation antenna is provided at an interrogation zone in a passageway leading to the exit of a store or a protected area in a store; and means are provided to cause the interrogation antenna to generate an alternating magnetic field at a given frequency and at an intensity sufficient to saturate a responder target in the interrogation zone. As a result, the responder target itself produces alternating magnetic fields at frequencies which are harmonics of the given transmitter frequency. A receiver antenna is also provided at the interrogation zone to receive the magnetic fields produced by the responder target. The receiver antenna is connected to a receiver which is tuned to detect signals at one or more of the harmonic frequencies produced by the responder target; and an alarm is connected to the receiver to be activated when such detection takes place.

Various refinements to the basic device shown in French Pat. No. 763,681 are shown and described in U.S. Pat. Nos. 4,623,877, 4,074,249, 4,118,693, 3,820,103, 3,820,104, 3673,437, 3,737,735, 3,534,243 and 4,326,198.

The French Pat. No. 763,681 discloses that if the responder target is of elongated configuration, it will be saturated earlier, i.e. at a lower intensity of the interrogating magnetic field, than a short target or responder. U.S. Pat. No. 3,790,945 states that in the case of a responder target with dimensions providing a very high ratio of length to square root of cross-sectional area, the signal resulting from the presence of the very high harmonics is far greater than that resulting from greater amounts of the same materials having non-preferred dimensions. According to this last mentioned patent, the responder target (i.e., "marker") should have a high magnetic permeability (Permalloy metal is suggested); and it should be provided with a very slender cross-section as compared with length, as for example a cross-sectional area of 0.0004 square centimeters, and a length of 4 centimeters or more, this same being comprised in a ribbon not thicker than 0.00125 centimeters. This patent also states that the responder target is preferably provided with a ratio of length to square root of cross-sectional area which exceeds 200.

U.S. Pat. No. 4,568,921 discloses an improvement over the above described Permalloy targets. According to that patent, responder targets are provided which comprise a length of drawn wire of an easily saturable magnetic material which has been heat treated, after drawing, to substantially increase its magnetic permeability. This provides a target having an extremely small cross section which makes it economical to manufacture in that it does not require much material. Furthermore such a small cross section makes it easy to conceal the responder target on an item to be protected. Moreover the novel responder target of that invention produces a very distinct magnetic field disturbance which is easily detectable. Nevertheless it is always advantageous to provide targets which have increased detectability and reduced sensitivity to mechanical handling.

It has also been proposed to flatten cold drawn Permalloy wire so as to increase its squareness ratio and its coercive force so that the material can be used in a magnetic memory. This is described in "Metallurgical Control of Magnetic Properties in Co-Fe and Ni-Fe Alloy for Memory Applications" by G. Y. Chin et al., Journal of Applied Physics, Vol. 42, No. 4, pp. 1502-1509 Mar. 15, 1971. However, the resulting increase in coercivity obtained by this technique makes the material unusable for a theft detection sensor because the magnetic fields generated by a draft detection system would not be high enough to drive such high coercivity material into saturation.

SUMMARY OF THE INVENTION

The present invention provides improvements over the prior art by making possible a theft detection system characterized by novel target or responder constructions which are smaller, more economical and which produce more distinctive magnetic field disturbances than are obtained by prior art target constructions.

According to one aspect of the present invention there is provided a magnetic type electronic theft detection apparatus which comprises means for generating an alternating magnetic interrogation field in an interrogation zone, means for detecting magnetic response fields having predetermined characteristics in the interrogation zone and responder targets mounted on protected items which must be carried through the interrogation zone when taken from a protected area. The responder targets each comprise an elongated strip of an easily saturable magnetic material which has been pressed to change its cross-section and heat treated thereafter to substantially increase its magnetic permeability.

According to another aspect of the invention there is provided a novel respond, or target for use in a magnetic theft detection system of the type in which an alternating magnetic interrogation field is generated in an interrogation zone and magnetic responses produced by a responder target passing through the interrogation zone are detected and, in response thereto, an alarm is actuated. The target comprises an elongated strip of an easily saturable magnetic material which has been pressed to change its cross-section and heat treated thereafter to substantially increase its magnetic permeability.

According to a further aspect of the invention there is provided a novel method of making a responder target for use in a magnetic theft detection system of the type in which an alternating magnetic interrogation field is generated in an interrogation zone and magnetic responses produced by a responder target passing through the interrogation zone are detected and, in response thereto, an alarm is actuated. This novel method comprises the steps of pressing an elongated trip of an easily saturable magnetic material to change its cross-section and thereafter heat treating the pressed strip to substantially increase its magnetic permeability.

By providing a target or responder which is pressed to change its cross-section the cross-sectional area of the target is no larger, and in fact is actually reduced from that of the original round cross-section; and therefore the ratio of length to square root of cross-section remains very high to provide high signal response. Furthermore, the pressing action does not adversely affect the magnetic characteristics of the target material in the same way that shearing does when strips are cut from an elongated sheet of the target material. For this reason also the target provides a very high signal response characteristic. It has also been found that by including in the alloy from which the target strip is formed, a texture improving substance, such as copper, the detectability of the target is even more significantly improved. It is believed that other texture improving substances may also be included in the alloy, such as titanium, niobium, vanadium, molybdenum, chromium and mixtures thereof. Where the texture improving substance is copper, it should be present in an amount of between 2% and 8%, and preferably about 5%, of the total weight of the alloy. Where the texture improving substance is other than copper it should not be present in an amount greater than 8% and its lower limit may differ somewhat from 2%.

Additional advantages and features of the invention will be seen from the following description.

DETAILED DESCRIPTION OF THE PREFERRED EMBODIMENTS

Figure 1:
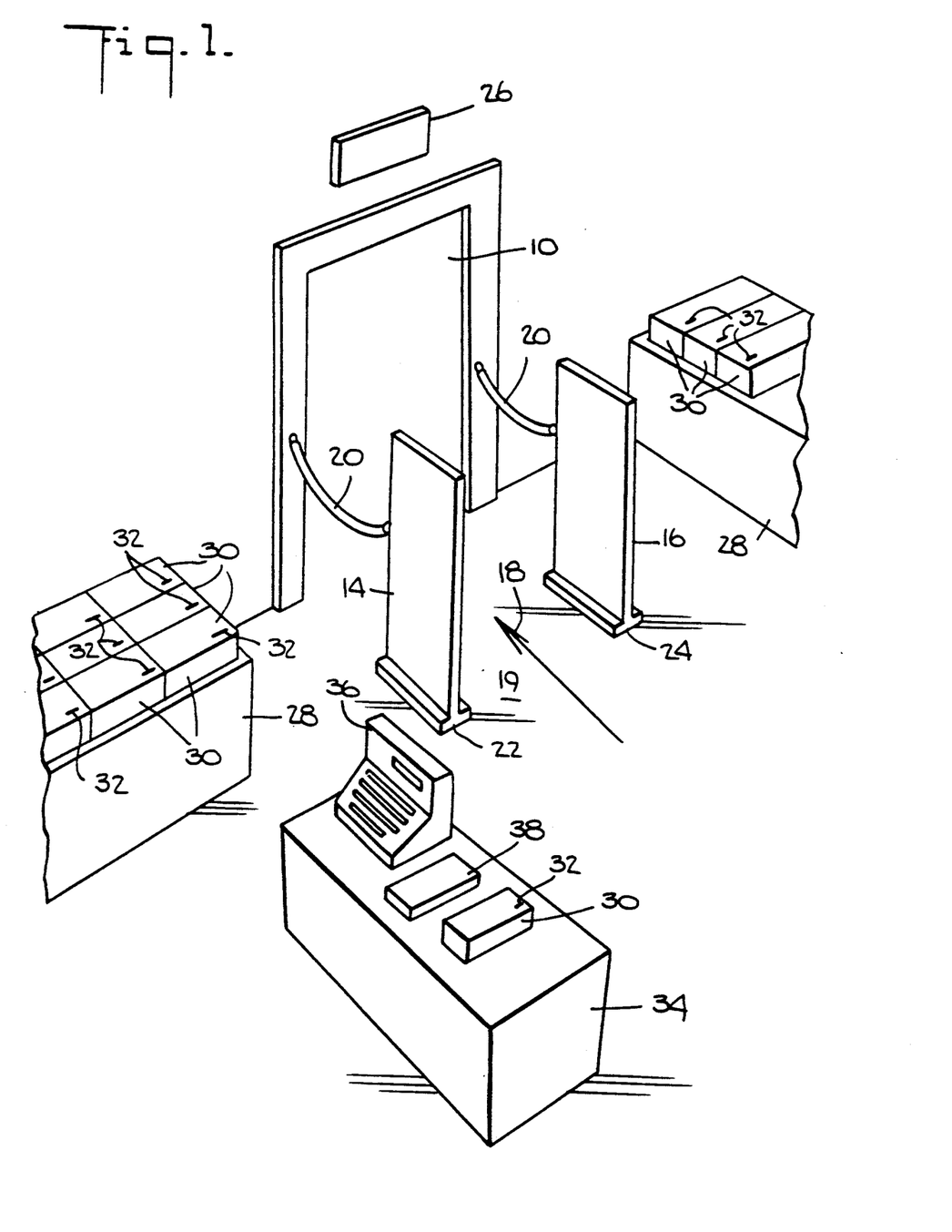
FIG. 1 is a perspective view of a store interior in which the present invention is used to prevent theft of merchandise.

As shown in FIG. 1 there is provided near a doorway 10 or other exit from a store or other protected region a pair of spaced apart antenna panels 14 and 16 arranged on opposite sides of a passageway (represented by an arrow 18) through which patrons in the store must pass in order to exit via the doorway 10. Suitable structure, such as ropes 20 may extend from the antenna panels 14 and 16 to the doorway 10, if the panels are spaced from the doorway, in order to prevent patrons from bypassing the passageway 18. The portion of the passageway between the antenna panels 14 and 16 comprises an interrogation zone 19.

The antenna panels 14 and 16 contain interrogation and receiver antenna coils (not shown) and they are mounted on bases 22 and 24 which contain electrical components (also not shown) to which the antenna coils are connected to and cause the interrogation antenna coils to generate an alternating magnetic interrogation field in the interrogation zone 19. The other electrical components are connected to the receiver antenna coil and convert predetermined magnetic disturbances, caused by the presence of protected merchandise in the interrogation zone 19, to produce an alarm signal. The alarm signal is suitably transmitted to an alarm, such as a lighted sign 26 above the doorway, to actuate the alarm and signal the unauthorized taking of protected merchandise from the store. An acoustical alarm may also be provided to be actuated concurrently with the visual alarm sign 26.

The particular construction and arrangement of the interrogation and receiver antenna coils and of the electrical components is not a part of this invention and will not be described herein. Reference is made however to the various patents identified above which show and describe in detail suitable apparatus for this purpose.

Within the store there are provided display cases 28 which contain items of merchandise 30 for inspection and purchase by customers in the store. The items 30 are provided with special responder targets 32 which, in their active state, interact with the alternating magnetic fields in the interrogation zone 19 to produce the predetermined magnetic disturbances which cause the alarm signal to be generated.

There is also provided in the store 10 a purchase and authorization counter 34 to which items of merchandise to be purchased are taken. At the purchase or authorization counter there is usually provided a cash register 36. There also may be provided a deactivation mechanism 38 for rendering the target 32 on a purchased item 30 incapable of producing the above mentioned predetermined disturbance of the interrogating magnetic field in the interrogation zone 19. Thus, when the item 30 is purchased and its target 32 is deactivated, the item may be carried through the passageway 18 and out through the doorway 10 without activating the alarm 26.

In an alternative arrangement the target is not deactivated but instead the purchased merchandise is bypassed by an authorized person around the interrogation zone 19 and then given to the patron who takes it out of the store.

Figures 2, 3, 4, 5, 6, 7, 8:
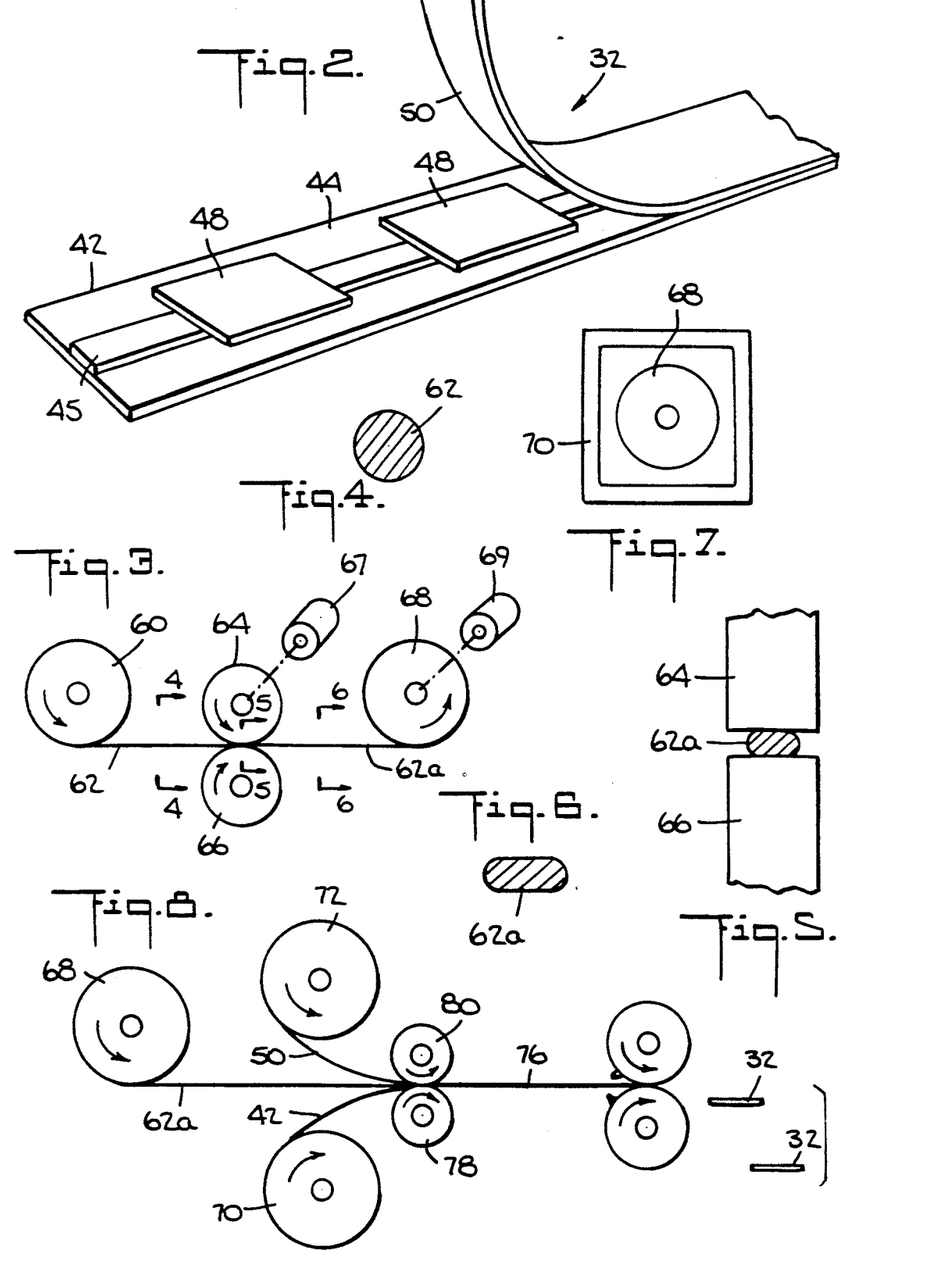
FIG. 2 is a perspective view showing a responder target construction according to the present invention.
FIG. 3 is a diagrammatic elevational view of a wire flattening apparatus used in forming a responder target according to the present invention.
FIG. 4 is an enlarged section view taken along line 4—4 of FIG. 3.
FIG. 5 is an enlarged section view taken along line 5—5 of FIG. 2.
FIG. 6 is an enlarged section view taken along line 6-6 of FIG. 2.
FIG. 7 is a diagrammatic section view of an annealing oven used in forming a responder target according to the present invention.
FIG. 8 is a diagrammatic elevational view of a laminating apparatus used in forming a responder target according to the present invention.

FIG. 2 shows the construction of the responder target assembly 32. As can be seen, the responder target assembly 32 comprises a base strip 42, in the form of a web of paper or plastic. The under side of the base strip 42, which is not shown in FIG. 2, may be printed with labeling information such as a commercial bar code. The upper surface of the strip 42 is provided with an adhesive coating 44; and a responder target 45 according to the invention, is adhered to the coating 44 on the strip.

The responder target 45 comprises a ribbon or rolled strip of easily saturable, low coercivity, or (i.e. magnetically soft), magnetizable material such as Permalloy, which has first been formed by drawing as a wire and thereafter rolled to form the wire into a flattened ribbon and finally annealed to render the material magnetically soft, i.e. to reduce its magnetic coercivity. Additionally, during the drawing and before flattening the material may be subjected to strain annealing to facilitate the cold working operations carried out in drawing and flattening. This magnetically soft material is driven alternately into and out of magnetic saturation by the alternate magnetic field generated in the interrogation zone 19; and, because of the non-linear response resulting from this alternate saturation, the responder target 45 disturbs the interrogation field by converting some of its energy into magnetic fields having frequencies which are harmonically related to the interrogation field frequency.

A plurality of spaced apart deactivation slugs 48 are adhered to the strip 42 on top of the responder target 45. The deactivation slugs 48 are of a high coercivity material which can be semi-permanently magnetized and demagnetized by application of an external magnetic field. Suitable high coercivity or magnetically hard material for this purpose is sold under the Registered Trademarks Vicalloy and Crovac. When the slugs 48 are magnetized, the magnetic fields they produce interfere with the response of the responder target 45 to the interrogation field and prevent it from responding as above described to the interrogation field. Consequently, the target 45 is deactivated when the slugs are magnetized and an article of merchandise can be carried through the interrogation zone 19 without causing an alarm to be actuated. The slugs 48 are magnetized by placing the target on the deactivation mechanism 38 (FIG. 1).

A peel strip 50 is provided to cover the adhesive coating 44 of the base strip 42 as well as the responder target 45 and the slugs 48. The peel strip has a release coating thereon which allows it to be peeled away, thus exposing the adhesive coating 44 and allowing the responder target assembly to be adhered to an item of merchandise 30.

FIG. 3 shows, schematically, an arrangement for forming the responder target 45 used in the target assembly 32. As there shown a spool 60, which contains a length of magnetically soft wire 62, such as Permalloy, which has been drawn and annealed, is mounted so that the wire is drawn off the spool and passes between a pair of flattening rolls 64 and 66. One of the rolls, e.g. the roll 64, is driven in the direction of wire movement by a drive mechanism 67. The wire 62 is flattened into the form of a flat strip 62a as it passes between the rolls; and the resulting flat strip is then taken up on a receiver spool 68. The receiver spool also is driven in the take up direction by a drive mechanism 69. The drive mechanisms 67 and 69 may be of any well known construction and the particular construction is not a part of this invention. The drive mechanisms 67 and 69 should be timed so that they do not produce undue tension on the wire 60 and the rolled strip 60a.

As shown in FIG. 4, the wire 62 between the supply spool 60 and the flattening rolls 64 and 66 has a round cross-section. As shown in FIG. 6, the peripheries of the rolls 64 and 66 are spaced apart less than the diameter of the wire and they therefore squeeze the wire into a flattened configuration. Thus, as shown in FIG. 6, the wire has been converted to a rolled strip 62a of flattened cross-section with rounded edges. Following the roll flattening step, the receiver spool 68 containing the rolled strip 62a is placed into an annealing oven 70 as shown schematically in FIG. 7. The rolled strip 62a is subjected to an appropriate atmosphere in the oven at a sufficient temperature and for a sufficient length of time to restore the magnetic characteristics of the strip material.

Following the annealing operation, the receiver spool 68 containing the rolled strip 62a is mounted, as shown in FIG. 8, on an assembly together with spools 70 and 72 containing the base strip 42 and the peel strip 50. These elements are pulled from their respective spools into a laminated assembly 76 which is pressed together between a pair of press rolls 78 and 80. The slugs 48 are also placed over the strip 62a in this assembly according to any well known technique. The laminated assembly then passes to a pair of cutoff rolls 82 and 84 which cut it into the individual target assemblies 32. The specific manner in which the lamination and cutting is carried out is not part of or critical to this invention and is well known. Accordingly, it is not described in detail herein.

It has been found that by subjecting magnetically soft wire to a cold rolling operation, i.e. at room temperature, to flatten it as described herein, and then annealing the thus flattened rolled strip, its response to alternating magnetic interrogation fields is very significantly improved. In particular, the energy distribution of the magnetic field disturbances produced by the thus treated material is shifted so that magnetic field components at high harmonics of the interrogation field frequency, e.g. in the vicinity of the twentieth harmonic, are greatly amplified. As a result it is easier to detect a target made of this material and to avoid false detection of other magnetizable objects which might be driven into and out of saturation by the interrogation field.

The target of this invention is preferably made from Permalloy wire having a composition, by weight percentage, of nickel (80%), iron (16%) and molybdenum (4%). This wire is available commercially under the Registered Trademark HyMu "80" from Carpenter Technology Corporation. Other compositions are believed to be useable provided that they are mechanically soft enough to be flattened by cold rolling and are magnetically soft so that they can be driven into and out of magnetic saturation by an interrogation field. In this connection, the coercivity of the target after flattening and annealing should be not substantially greater than 1.5 oersteds. It has also been found that by including a texture improving substance in the alloy from which the target strip is formed according to the invention, the detectability of the target is even more significantly improved. Such substance, which is preferably copper, should be in the range of 3% to 6% of the total weight of the alloy. Below 2% copper does not produce significant improvement in detectability and more than 8% copper results excessive magnetic coercivity and causes the alloy to become brittle during preliminary hot forming operations. Preferably the texture improving substance consists of copper in the amount of 5% of the total weight of the alloy. A preferred alloy is "Mumetal". The Mumetal may also have 2% chromium added. It is believed that other texture improving materials such as titanium, nicobium, vanadium, molybdenum and mixtures thereof with or without copper or chromium, may be used in addition to or in place of copper. These materials should not exceed 8% of the total weight of the alloy but the lower limit of their concentration may vary from 2%.

The addition of a material such as copper, to Permalloy would not be expected to provide improved results because it is known that copper increases the magnetic coercivity of the material and thus would require a greater magnetic field to drive it into saturation. However, it has been found that when a material such as copper is present, such material controls the crystalline grain orientation of the alloy during flattening and subsequent heat treating; and as a result, the squareness of the resulting magnetic hysteresis characteristic is improved. This outweighs the effect of the increased coercivity. The diameter of the wire 60 is preferably about 0.008 inches (0.2 mm). Larger diameters can be used since the rolling operation reduces the cross-section approximately 25%. It is preferred to maintain the diameter small enough so as to keep the ratio of target length to cross-section as large as possible. It is well known that when this ratio is large, the response characteristics of the target are maximized. Thus, a diameter larger than 0.010 inches (0.25 mm) is not preferred. Diameters less than mentioned above can also be used; however if the target cross-section is too small, the target becomes invisible to the magnetic interrogation field and does not disturb a sufficient portion of interrogation field energy. Thus, the wire diameter should not be less than about 0.005 inches (0.13 mm).

The peripheries of the flattening rolls 64 and 66 are preferably set to a spacing such that they squeeze the wire 62 to a thickness of about one fourth its original diameter. Thus, the rolls 64 and 66 should be set with their peripheries spaced about 0.002 inches (0.05 mm) when 0.008 inch (0.20 mm) diameter wire is used. This results in a cross-section of the rolled strip 62a of $0.019 \times 0.002$ inches ($0.48 \times 0.051$ mm). It will be noted that the area of this cross-section is somewhat less than the cross-section of the wire 62. This is due to the fact that some longitudinal stretching is produced in the strip during the rolling operation. Moreover, the strip 62a is free from stresses in all directions other than in the direction of the rolls 64 and 66 during the flattening operation. As a result the reduction in cross-section is minimized. In addition, it is believed that this freedom from stresses during the rolling operation results in a reorientation of the crystal grains of the strip such that the magnetic characteristics of the strip are enhanced.

Actually the flattening operation can be carried out in a series of steps, e.g. three, so as to reduce the stress on the flattening rolls. The number of steps used in the flattening operation does not appear to have significant effect on the magnetic characteristics of the finished target.

The annealing operation should be carried out in a protective atmosphere, for example an atmosphere of dissociated ammonia (a mixture of nitrogen and hydrogen), dry hydrogen, an inert gas or a mixture thereof or a vacuum, all of which will prevent oxidation.

It has been found that effective annealing can be obtained at a temperature as low as 650° Centigrade if the temperature is held for one half hour. Also, effective annealing can be carried out within one minute if the temperature is maintained at about 850° Centigrade. The lower temperature with longer annealing time is more suitable for the batch type annealing illustrated in FIG. 7 whereas the higher temperature with shorter annealing time is more suitable for a continuous annealing process.

It will be noted that these combinations of temperature and time, which reduce the magnetic coercivity of the material, are lower than those normally used for annealing. Actually these low temperature-time combinations reduce the coercivity to a greater degree than they reduce mechanical hardness. Therefore the resulting material which is magnetically soft and therefore suitable for use in a theft detection system, retains a certain amount of mechanical hardness and is less susceptible to degradation through handling than conventionally annealed material.

The responder target of the present invention provides significantly better response to magnetic interrogation fields than responder targets made of drawn Permalloy wire or strips sheared from Permalloy sheets and is less sensitive to mechanical handling than either of these prior targets.

We claim:

1. A magnetic type electronic theft detection apparatus comprising means for generating an alternating magnetic interrogation field in an interrogation zone, means for detecting magnetic response fields having predetermined characteristics in said interrogation zone and responder targets mounted on protected items which must be carried through said interrogation zone when taken from a protected area, said responder targets each comprising a drawn wire of a magnetic material which is easily saturable by said magnetic interrogation field in said interrogation zone and which has been rolled to change its cross-sectional shape and heat treated thereafter to substantially increase its magnetic permeability.

2. A magnetic type electronic theft detection apparatus according to claim 1, wherein said wire has been cold rolled.

3. A magnetic type electronic theft detection apparatus according to claim 2, wherein said wire has been rolled from a round cross-section to a flattened cross-section.

4. A magnetic type electronic theft detection apparatus according to claim 1, wherein said wire has been maintained free of stresses in all directions other than in the direction of rolling.

5. A magnetic type electronic theft detection apparatus according to claim 4, wherein said drawn wire has been heat treated prior to rolling.

6. A magnetic type electronic theft detection apparatus according to claim 5, wherein said wire has been flattened by rolling same between a pair of rolls at room temperature.

7. A magnetic type electronic theft detection apparatus according to claim 5, wherein said wire has been flattened to a thickness of about one fourth of its original diameter.

8. A magnetic type electronic theft detection apparatus according to claim 4, wherein said easily saturable magnetic material is Permalloy.

9. A magnetic type electronic theft detection apparatus according to claim 8, wherein said flattened wire has been heat treated by annealing same at a temperature of at least 650 degrees Centigrade in an annealing atmosphere for a duration of at least one half hour.

10. A magnetic type electronic theft detection apparatus according to claim 8, wherein said flattened wire has been heat treated by annealing same at a temperature of at least 850 degrees Centigrade in an annealing atmosphere for a duration of at least one minute.

11. A magnetic type electronic theft detection apparatus according to claim 8, wherein said flattened wire has been heat treated by annealing same in an atmosphere consisting essentially of one of the group of dissociated ammonia, dry hydrogen, an inert gas, a mixture thereof and a vacuum.

12. A magnetic type electronic theft detection apparatus according to claim 4, wherein said wire has been flattened from a diameter of between 0.005 and 0.010 inches (0.13 and 0.25 mm).

13. A magnetic type electronic theft detection apparatus according to claim 4, wherein said wire has been flattened from a diameter of about 0.008 inches (0.20 mm).

14. A magnetic type electronic theft detection apparatus according to claim 13, wherein said wire has been flattened to a thickness of about 0.002 inches (0.05 mm).

15. A magnetic type electronic theft detection apparatus according to claim 1, wherein said easily saturable material is a nickel-iron alloy containing about 80% nickel.

16. A magnetic type electronic theft detection apparatus according to claim 15, wherein said alloy contains one or more metals taken from the group consisting of copper, titanium, niobium, vanadium, molybdenum, chromium and mixtures thereof.

17. A magnetic type electronic theft detection apparatus according to claim 15, wherein said alloy contains from 2% to 8%, by total weight of the alloy, of copper.

18. A magnetic type electronic theft detection apparatus according to claim 15, wherein said alloy contains about 5% by total weight of the alloy, of copper.

19. A magnetic type electronic theft detection apparatus according to claim 15, wherein said alloy contains about 4% molybdenum.

20. A responder target for use in a magnetic theft detection system of the type in which an alternating magnetic interrogation field is generated in an interrogation zone and magnetic responses produced by a responder target passing through said interrogation zone are detected and, in response thereto, an alarm is actuated, said target comprising a drawn wire of a magnetic material which is easily saturable by a magnetic interrogation field in an interrogation zone and which has been rolled to change its cross-sectional shape and heat treated thereafter to substantially increase its magnetic permeability.

21. A responder target according to claim 20, wherein said wire has been cold rolled.

22. A responder target according to claim 21 wherein said wire has been rolled from a round cross-section to a flattened cross-section.

23. A responder target according to claim 20, wherein said wire has been maintained free of stresses in all directions other than in the direction of rolling.

24. A responder target according to claim 23, wherein said drawn wire has been heat treated prior to rolling.

25. A responder target according to claim 24, wherein said wire has been flattened by rolling same between a pair of rolls at room temperature.

26. A responder target electronic theft detection apparatus according to claim 24, wherein said wire has been flattened to a thickness of about one fourth of its original diameter.

27. A responder target according to claim 23, wherein said easily saturable magnetic material is Permalloy.

28. A responder target according to claim 27, wherein said flattened wire has been heat treated by annealing same at a temperature of at least 650 degrees Centigrade in an annealing atmosphere for a duration of at least one half hour.

29. A responder target according to claim 27 wherein said flattened wire has been heat treated by annealing same at a temperature of at least 850 degrees Centigrade in an annealing atmosphere for a duration of at least one minute.

30. A responder target according to claim 27, wherein said flattened wire has been heat treated by annealing same in an atmosphere consisting essentially of one of the group of dissociated ammonia, dry hydrogen, an inert gas, a mixture thereof and a vacuum.

31. A responder target according to claim 23, wherein said wire has been flattened from diameter of between 0.005 and 0.010 inches (0.13 and 0.25 mm).

32. A responder target according to claim 23, wherein said wire has been flattened from diameter of about 0.008 inches (0.20 mm).

33. A responder target according to claim 32, wherein said wire has been flattened to a thickness of about 0.002 inches (0.05 mm).

34. A responder target according to claim 20 wherein said easily saturable material is a nickel-iron alloy containing about 80% nickel.

35. A responder target according to claim 34, wherein said alloy contains one or more metals taken from the group consisting of copper, titanium, niobium, vanadium, molybdenum, chromium and mixtures thereof.

36. A responder target according to claim 34, wherein said alloy contains from 2% to 8%, by total weight of the alloy, of copper.

37. A responder target according to claim 34, wherein said alloy contains about 5%, by total weight of the alloy, of copper.

38. A responder target according to claim 34, wherein said alloy contains about 4% molybdenum.

39. A method of making a responder target for use in a magnetic theft detection system of the type in which an alternating magnetic interrogation field is generated in an interrogation zone and magnetic responses produced by a responder target passing through said interrogation zone are detected, and in response thereto, an alarm is actuated, said method comprising the steps of rolling a drawn wire of a magnetic material which is easily saturable by a magnetic interrogation field in an interrogation zone, to change its cross-sectional shape and thereafter heat treating the rolled wire to substantially increase its magnetic permeability.

40. A method according to claim 39, wherein said wire is cold rolled.

41. A method according to claim 40, wherein said wire initially has a round cross-section and said rolling is carried out to change said wire to a flattened cross-section.

42. A method of making a responder target according to claim 39, wherein said wire is maintained free of stresses in all directions other than in the direction of rolling.

43. A method according to claim 42, wherein said drawn wire has been heat treated prior to rolling.

44. A method of making a responder target according to claim 43, wherein said wire has been flattened by rolling same between a pair of rolls at room temperature.

45. A method of making a responder target according to claim 43, wherein said wire has been flattened to a thickness of about one fourth of its original diameter.

46. A method of making a responder target according to claim 42, wherein said easily saturable magnetic material is Permalloy.

47. A method of making a responder target according to claim 46, wherein said flattened wire is heat treated by annealing same at a temperature of at least 650 degrees Centigrade in an annealing atmosphere for a duration of at least one half hour.

48. A method according to claim 46 wherein said flattened wire is heated treated by annealing same at a temperature of at least 850 degrees Centigrade in annealing atmosphere for a duration of at least one minute.

49. A method according to claim 46 wherein said flattened wire has been heat treated by annealing same in an atmosphere consisting essentially of one of the group of dissociated ammonia, dry hydrogen, an inert gas, a mixture thereof and a vacuum.

50. A method of making a responder target according to claim 42, wherein said wire has been flattened from a diameter of between 0.005 and 0.010 inches (0.13 and 0.25 mm).

51. A method of making a responder target according to claim 42, wherein said wire has been flattened from a diameter of about 0.008 inches (0.20 mm).

52. A method of making a responder target according to claim 51, wherein said wire has been flattened to a thickness of about 0.002 inches (0.05 mm).

53. A method of making a responder target according to claim 39, wherein said easily saturable material is a nickel-iron alloy containing about 80% nickel.

54. A method according to claim 53, wherein said alloy contains one or more metals taken from the group consisting of copper, titanium, niobium, vanadium, molybdenum, chromium and mixtures thereof.

55. A method according to claim 53, wherein said alloy contains from 2% to 8%, a total weight of the alloy, of copper.

56. A method according to claim 53, wherein said alloy contains about 5%, by total weight of the alloy, of copper.

57. A method of making a responder target according to claim 53, wherein said alloy contains about 4% molybdenum.

* * * * *

UNITED STATES PATENT AND TRADEMARK OFFICE
CERTIFICATE OF CORRECTION

PATENT NO. : 5,146,204
DATED : September 8, 1992
INVENTOR(S) : PETER Y. ZHOU ET AL.

It is certified that error appears in the above-identified patent and that said Letters Patent is hereby corrected as shown below:

COLUMN 1

Line 10, "Y. Peter Zhou" should read --Peter Y. Zhou--.
Line 52, "3673,437," should read --3,673,437,--.

COLUMN 2

Line 59, "respond, or" should read --responder--.

COLUMN 3

Line 11, "trip" should read --strip--.
Line 26, "It" should read --¶ It--.
Line 55, "FIG. 2;" should read --FIG. 3;--.
Line 57, "FIG. 2;" should read --FIG. 3;--.

COLUMN 5

Line 62, "wire 60" should read --wire 62-- and "rolled strip 60a." should read --rolled strip 62a.--.
Line 65, "FIG. 6," should read --FIG. 5,--.

COLUMN 6

Line 58, "results" should read --results in--.
Line 65, "nicobium," should read --niobium,--.

COLUMN 7

Line 14, "The" should read --¶ The-- and "wire 60" should read --wire 62--.

UNITED STATES PATENT AND TRADEMARK OFFICE
CERTIFICATE OF CORRECTION

PATENT NO. : 5,146,204

DATED : September 8, 1992

INVENTOR(S) : PETER Y. ZHOU ET AL.

It is certified that error appears in the above-identified patent and that said Letters Patent is hereby corrected as shown below:

COLUMN 9

Line 30, "5% by" should read --5%, by--.

COLUMN 10

Line 4, "claim 27" should read --claim 27,--.
    Line 12, "dissociated" should read --disassociated--.
    Line 15, "diameter" should read --a diameter--.
    Line 18, "diameter" should read --a diameter--.
    Line 23, "claim 20" should read --claim 20,--.

COLUMN 11

Line 13, "claim 46" should read --claim 46,--.
    Line 16, "in an-" should read --in an- --.
    Line 18, "claim 46" should read --claim 46,--.

COLUMN 12

Line 17, "a" should read --by--.

Signed and Sealed this

Seventh Day of December, 1993

Attest:

BRUCE LEHMAN

Attesting Officer

Commissioner of Patents and Trademarks